US011064809B2

(12) United States Patent
Conrad

(10) Patent No.: US 11,064,809 B2
(45) Date of Patent: Jul. 20, 2021

(54) FOLDABLE EASEL BLANK

(71) Applicant: Pratt Corrugated Holdings, Inc., Conyers, GA (US)

(72) Inventor: Hannah Conrad, Memphis, TN (US)

(73) Assignee: Pratt Corrugated Holdings, Inc., Conyers, GA (US)

( * ) Notice: Subject to any disclaimer, the term of this patent is extended or adjusted under 35 U.S.C. 154(b) by 0 days.

(21) Appl. No.: 16/841,155

(22) Filed: Apr. 6, 2020

(65) Prior Publication Data

US 2020/0229602 A1 Jul. 23, 2020

Related U.S. Application Data

(63) Continuation of application No. 15/869,885, filed on Jan. 12, 2018, now Pat. No. 10,687,624, which is a (Continued)

(51) Int. Cl.
*A47B 97/08* (2006.01)
*A47B 23/04* (2006.01)

(Continued)

(52) U.S. Cl.
CPC ............ *A47B 97/08* (2013.01); *A47B 23/044* (2013.01); *A47F 5/112* (2013.01);

(Continued)

(58) Field of Classification Search
CPC .......... A47B 2220/0019; A47B 23/043; A47B 23/044; A47B 97/08; A47B 19/08;

(Continued)

(56) References Cited

U.S. PATENT DOCUMENTS

| | | | |
|---|---|---|---|
| 773,177 A | 10/1904 | Wilson | |
| 809,785 A | 1/1906 | Dahlberg | |

(Continued)

FOREIGN PATENT DOCUMENTS

| | | | |
|---|---|---|---|
| GB | 2369478 A * | 5/2002 | ......... G09F 15/0062 |
| WO | 6666666 | 4/2015 | |
| WO | 2015071383 | 5/2015 | |

OTHER PUBLICATIONS

Conrad, Hannah; Applicant-Initiated Interview Summary for U.S. Appl. No. 15/239,518, filed Aug. 17, 2016 dated Jan. 18, 2017, 3 pgs.

(Continued)

*Primary Examiner* — Jonathan Liu
*Assistant Examiner* — Taylor L Morris
(74) *Attorney, Agent, or Firm* — Taylor English Duma LLP

(57) ABSTRACT

A foldable easel blank includes a main panel defining a first side and a second side, the first side positioned opposite from the second side, the main panel defining a locking aperture extending through the main panel from a front main surface to a rear main surface; a support panel hingedly connected to the main panel, the support panel defining a locking tab configured to engage the locking aperture; a first side panel hingedly connected to the first side of the main panel by a first side hinge; a second side panel hingedly connected to the second side of the main panel by a second side hinge; and a base panel positioned between the first side hinge and the second side hinge, the base panel configured to engage the first side panel and the second side panel to form a base stand.

9 Claims, 12 Drawing Sheets

Related U.S. Application Data continuation of application No. 15/239,518, filed on Aug. 17, 2016, now Pat. No. 9,901,174.

(51) Int. Cl.
*A47F 5/11* (2006.01)
*G06F 1/06* (2006.01)
*G06F 1/04* (2006.01)
*G09F 1/06* (2006.01)
*G09F 1/04* (2006.01)

(52) U.S. Cl.
CPC ................. *A47B 2220/0019* (2013.01); *A47B 2220/0083* (2013.01); *A47F 5/11* (2013.01); *A47F 5/116* (2013.01); *G09F 1/04* (2013.01); *G09F 1/06* (2013.01)

(58) Field of Classification Search
CPC .......... A47B 23/042; A47B 2220/0086; A47B 2220/0083; A47F 5/11; A47F 5/112; A47F 5/118; A47F 5/10; A47F 5/116; G09F 1/06; G09F 1/04; G09F 1/14; A47G 1/141
USPC ....... 248/453, 459, 460, 174, 465, 152, 150, 248/441.1; 40/754, 755, 120, 124.16, 40/610; 211/50, 73, 132.1, 135, 149
See application file for complete search history.

(56) References Cited

U.S. PATENT DOCUMENTS

| | | | | | |
|---|---|---|---|---|---|
| 896,231 | A | | 8/1908 | Mulkey | |
| 1,020,583 | A | | 3/1912 | Streit | |
| 1,050,403 | A | | 1/1913 | Streit | |
| 1,086,690 | A | | 2/1914 | Rosenberg | |
| 1,132,629 | A | | 3/1915 | Springman | |
| 1,134,802 | A | | 4/1915 | Agar | |
| 1,272,349 | A | | 7/1918 | Abrahams | |
| 1,391,479 | A | | 9/1921 | Manoog | |
| 1,435,658 | A | | 11/1922 | Prehn | |
| 1,438,963 | A | * | 12/1922 | Miller | A47F 5/112 248/459 |
| 1,476,216 | A | | 12/1923 | Palais | |
| 1,491,091 | A | | 4/1924 | Flynn | |
| 1,594,848 | A | | 8/1926 | Partens | |
| 1,653,707 | A | | 12/1927 | Hornecker | |
| 1,675,060 | A | | 6/1928 | Simmons | |
| 1,698,357 | A | * | 1/1929 | Block | G09F 1/06 40/571 |
| 1,875,460 | A | | 9/1932 | Holy | |
| 1,953,673 | A | * | 4/1934 | Davidson | G09F 1/04 40/124.16 |
| 1,976,421 | A | | 10/1934 | Traeger et al. | |
| 2,101,327 | A | | 12/1937 | Ziemmerman | |
| 2,135,093 | A | * | 11/1938 | Abrams | B65D 5/5266 248/152 |
| 2,270,763 | A | | 1/1942 | Nofziger | |
| 2,278,076 | A | * | 3/1942 | Horr | G09F 1/14 40/124.18 |
| 2,322,259 | A | | 6/1943 | Thurston | |
| 2,324,027 | A | | 7/1943 | Rosenberg et al. | |
| 2,443,645 | A | * | 6/1948 | Turan | A47G 1/141 40/750 |
| 2,474,659 | A | | 6/1949 | Ebert | |
| 2,630,641 | A | | 3/1953 | Hessdoerfer | |
| 2,677,469 | A | | 5/1954 | Ebert | |
| 2,902,785 | A | | 9/1959 | Nichols | |
| 2,931,515 | A | | 4/1960 | Rubin | |
| 2,940,710 | A | * | 6/1960 | Adams | A47F 5/114 248/174 |
| 2,976,631 | A | | 3/1961 | Paschal | |
| 2,992,500 | A | | 7/1961 | Hayhow | |
| D192,566 | S | | 4/1962 | Perry | |
| 3,128,984 | A | * | 4/1964 | Palm | B60N 3/103 248/311.2 |
| 3,275,281 | A | | 9/1966 | Sampson | |
| 3,640,010 | A | | 2/1972 | Altman et al. | |
| 3,727,874 | A | | 4/1973 | Wuensch | |
| 4,291,798 | A | | 9/1981 | Transport | |
| 4,330,102 | A | | 5/1982 | Gebhardt et al. | |
| 4,384,651 | A | * | 5/1983 | Smith | A47F 5/114 211/132.1 |
| 4,773,173 | A | | 9/1988 | Christian | |
| 5,083,663 | A | | 1/1992 | Conway et al. | |
| 5,154,392 | A | | 10/1992 | Voight | |
| 5,165,649 | A | | 11/1992 | Neumann et al. | |
| D334,479 | S | | 4/1993 | Glick | |
| 5,213,220 | A | * | 5/1993 | McBride | A47B 43/00 211/126.16 |
| 5,277,388 | A | | 1/1994 | Denaro | |
| 5,301,800 | A | | 4/1994 | Kenney | |
| 5,351,928 | A | | 10/1994 | Cooper et al. | |
| D366,568 | S | | 1/1996 | Pagano | |
| 5,653,333 | A | | 8/1997 | Webster | |
| D386,008 | S | | 11/1997 | Wong | |
| 5,850,910 | A | | 12/1998 | Broyles et al. | |
| 6,050,425 | A | * | 4/2000 | Kappel | A47B 43/02 211/40 |
| 6,237,887 | B1 | | 5/2001 | Banner | |
| 6,382,581 | B1 | | 5/2002 | Duff | |
| 6,450,327 | B1 | | 9/2002 | Kikuchi | |
| 6,508,023 | B2 | | 1/2003 | Moss et al. | |
| 6,557,897 | B1 | | 5/2003 | Gaudet | |
| 6,581,895 | B1 | | 6/2003 | Pleasant | |
| 6,966,447 | B2 | | 11/2005 | Hiltke et al. | |
| 7,000,882 | B2 | | 2/2006 | Snuffer | |
| D518,240 | S | | 3/2006 | Bossomo et al. | |
| 7,182,305 | B2 | | 2/2007 | Dempsey | |
| 7,185,869 | B2 | | 3/2007 | Smith | |
| 7,367,539 | B2 | | 5/2008 | Moss et al. | |
| D602,227 | S | | 10/2009 | Zeilinger | |
| 7,861,995 | B2 | | 1/2011 | Liou | |
| 7,967,154 | B1 | | 6/2011 | Sharon | |
| D643,223 | S | | 8/2011 | Harding | |
| D643,635 | S | | 8/2011 | Harding | |
| 8,136,678 | B2 | | 3/2012 | Moss | |
| D674,016 | S | | 1/2013 | Letterle | |
| D677,935 | S | | 3/2013 | Pirayesh et al. | |
| D683,973 | S | | 6/2013 | Pitts Brown | |
| 8,540,091 | B2 | | 9/2013 | Kristensen | |
| D696,031 | S | | 12/2013 | Pitts Brown | |
| 8,863,420 | B2 | | 10/2014 | Edmondson et al. | |
| 8,925,228 | B2 | | 1/2015 | Edmondson et al. | |
| D725,946 | S | | 4/2015 | Pirayesh et al. | |
| 9,174,483 | B2 | | 11/2015 | Ridless et al. | |
| 9,265,366 | B2 | | 2/2016 | Zhou et al. | |
| 9,358,830 | B1 | | 6/2016 | McLaughlin | |
| D771,615 | S | | 11/2016 | Pignotti | |
| D787,202 | S | | 5/2017 | Martin | |
| 9,901,174 | B1 | | 2/2018 | Conrad | |
| D811,753 | S | | 3/2018 | Conrad | |
| 10,687,624 | B2 | | 6/2020 | Conrad | |
| 2003/0145499 | A1 | | 8/2003 | Tarter et al. | |
| 2004/0016375 | A1 | | 1/2004 | Grueneberg | |
| 2007/0240345 | A1 | * | 10/2007 | Davis | G09F 19/14 40/453 |
| 2007/0284490 | A1 | | 12/2007 | Cox | |
| 2010/0032322 | A1 | | 2/2010 | O'Neill | |
| 2011/0068245 | A1 | * | 3/2011 | Livingston | F16M 13/00 248/460 |
| 2013/0000169 | A1 | | 1/2013 | Ramos-Gonzalez et al. | |
| 2013/0062294 | A1 | * | 3/2013 | Beaty | A47B 47/042 211/59.2 |
| 2013/0270413 | A1 | | 10/2013 | Wilber et al. | |
| 2014/0013637 | A1 | | 1/2014 | Feagins et al. | |
| 2014/0314971 | A1 | | 10/2014 | Domanski et al. | |
| 2014/0318722 | A1 | | 10/2014 | Ridless | |
| 2014/0363592 | A1 | | 12/2014 | Zhou et al. | |
| 2016/0143461 | A1 | | 5/2016 | Millman et al. | |

(56) References Cited

U.S. PATENT DOCUMENTS

| | | | |
|---|---|---|---|
| 2018/0049549 A1 | 2/2018 | Conrad | |
| 2018/0132617 A1 | 5/2018 | Conrad | |

OTHER PUBLICATIONS

Conrad, Hannah; Corrected Notice of Allowability for U.S. Appl. No. 15/239,518, filed Aug. 17, 2016, dated Jan. 18, 2018, 7 pgs.
Conrad, Hannah; Final Office Action for U.S. Appl. No. 15/239,518, filed Aug. 17, 2016, dated May 1, 2017, 16 pgs.
Conrad, Hannah; Issue Notification for U.S. Appl. No. 15/239,518, filed Aug. 17, 2016, dated Feb. 7, 2018, 1 pg.
Conrad, Hannah; Non-Final Office Action for U.S. Appl. No. 15/239,518, filed Aug. 17, 2016, dated Dec. 21, 2016, 23 pgs.
Conrad, Hannah; Non-final Office Action for U.S. Appl. No. 15/239,518, filed Aug. 17, 2016, dated Jun. 9, 2017, 21 pgs.
Conrad, Hannah; Notice of Allowance for U.S. Appl. No. 15/239,518, filed Aug. 17, 2016, dated Oct. 24, 2017, 13 pgs.
Conrad, Hannah; Final Office Action for U.S. Appl. No. 15/869,885, filed Jan. 21, 2018, dated Sep. 25, 2019, 10 pgs.
Conrad, Hannah; Non-Final Office Action for U.S. Appl. No. 15/869,885, filed Jan. 12, 2018, dated Aug. 5, 2019, 33 pgs.
Conrad, Hannah; Notice of Allowance for U.S. Appl. No. 15/869,885, filed Jan. 12, 2018, dated Jan. 16, 2020, 5 pgs.
Conrad, Hannah; Notice of Allowance for U.S. Appl. No. 15/869,885, filed Jan. 12, 2018, dated May 7, 2020, 9 pgs.
Conrad, Hannah; Ex Parte Quayle Action for U.S. Appl. No. 29/574,628, filed Aug. 17, 2016, mailed Sep. 12, 2017, 25 pgs.
Conrad, Hannah; Issue Notification for U.S. Appl. No. 29/574,628, filed Aug. 14, 2016, dated Feb. 14, 2018, 1 pg.
Conrad, Hannah; Notice of Allowance for U.S. Appl. No. 29/574,628, filed Aug. 17, 2016, dated Nov. 14, 2017, 5 pgs.
Conrad, Hannah; Supplemental Notice of Allowability for a Design Application for U.S. Appl. No. 29/574,628, filed Aug. 17, 2016, dated Jan. 29, 2018, 6 pgs.

* cited by examiner

FOLDABLE EASEL BLANK

CROSS-REFERENCE TO RELATED APPLICATIONS

This application is a continuation of U.S. application Ser. No. 15/869,885, filed Jan. 12, 2018, which is a continuation of U.S. application Ser. No. 15/239,518, filed Aug. 17, 2016, which issued into U.S. Pat. No. 9,901,174 on Feb. 27, 2018, each of which are hereby incorporated by reference herein in their entireties.

TECHNICAL FIELD

This disclosure relates to easels. More specifically, this disclosure relates to foldable blanks which can be folded to assemble an easel.

BACKGROUND

Painters, artists, and art students frequently use easels to support a work piece, such as a canvas, while painting or drawing. Traditional easels are often made of wood and metal, and can be heavy and expensive. Traditional easels are often collapsible, but are still bulky and cumbersome to store. It would be desirable to have a low-cost, lightweight easel that can be assembled from a flat blank and unfolded again for convenient storage.

SUMMARY

Disclosed is a foldable easel blank comprising a main panel defining a first side and a second side, the first side positioned opposite from the second side, the main panel defining a locking aperture extending through the main panel from a front main surface to a rear main surface, the front main surface positioned opposite from the rear main surface; a support panel hingedly connected to the main panel, the support panel defining a locking tab configured to engage the locking aperture; a first side panel hingedly connected to the first side of the main panel by a first side hinge; a second side panel hingedly connected to the second side of the main panel by a second side hinge; and a base panel positioned between the first side hinge and the second side hinge, the base panel configured to engage the first side panel and the second side panel to form a base stand.

Also disclosed is a folded easel comprising a base stand comprising a main panel; a first side panel hingedly connected to the main panel by a first side hinge; a second side panel hingedly connected to the main panel by a second side hinge; and a base panel hingedly connected to the main panel, the base panel coupled to the first side panel and the second side panel; and a ledge connected to the main panel; and wherein the base panel is positioned between the first side hinge and the second side hinge when the base panel is substantially coplanar with the main panel in an unfolded position.

Also disclosed is a method for assembly a folded easel comprising obtaining a foldable easel blank, the foldable easel blank comprising a main panel, the main panel defining a front main surface and a rear main surface, the front main surface positioned opposite from the rear main surface; a first side panel hingedly connected to the main panel by a first side hinge; a second side panel hingedly connected to the main panel by a second side hinge; and a base panel hingedly connected to the main panel by a base hinge, the base panel positioned between the first side hinge and the second side hinge; and folding the first side panel about the first side hinge towards the rear main surface; folding the second side panel about the second side hinge towards the rear main surface; folding the base panel about the base hinge towards the rear main surface; and forming a base stand, forming the base stand comprising securing the base panel to the first side panel and the second side panel.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1:
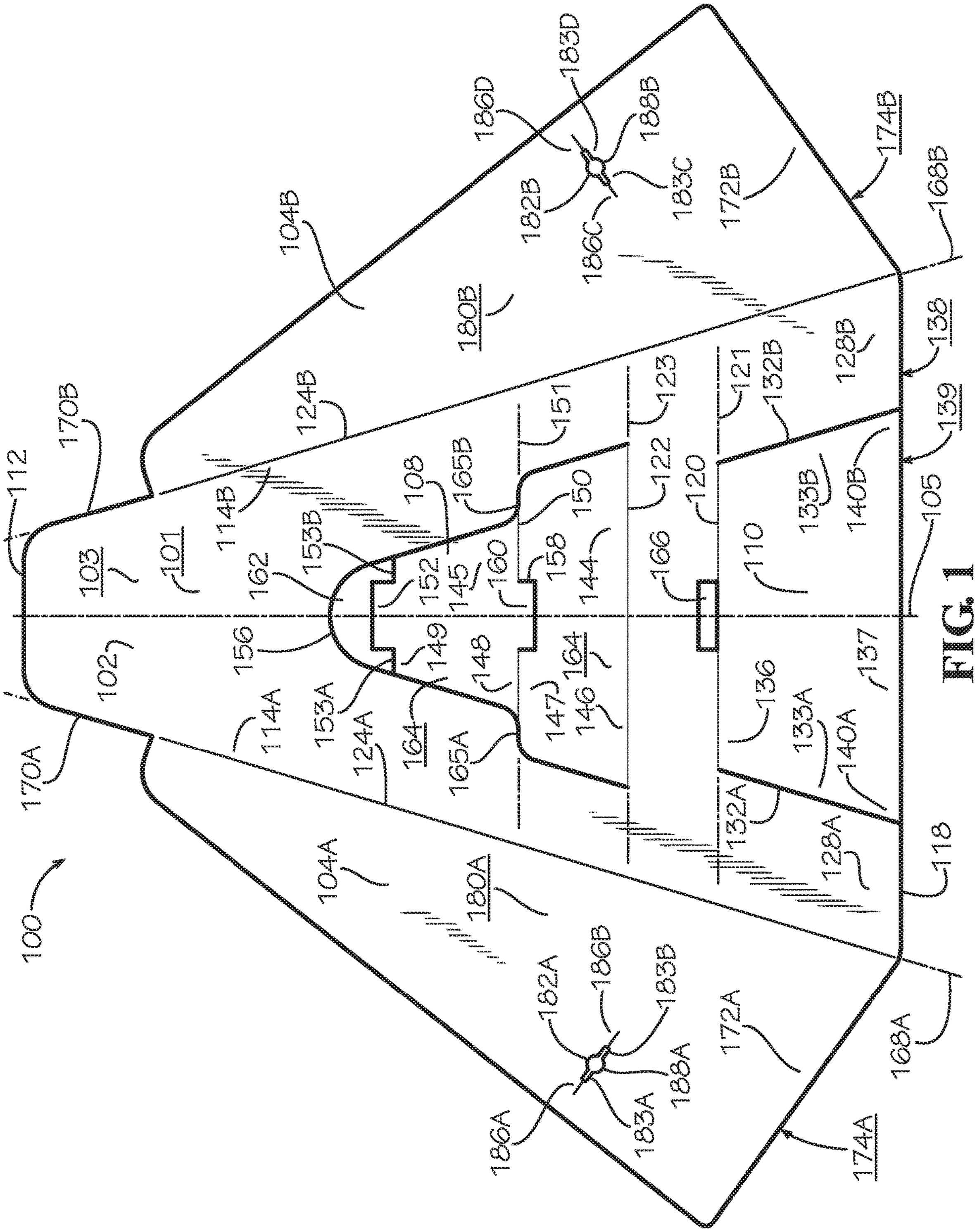
FIG. 1 is a top view of a foldable easel blank in the unfolded position.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in their best, currently known embodiments. To this end, those skilled in the relevant art will recognize and appreciate that many changes can be made to the various aspects described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can comprise two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "can," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or Steps are included or are to be performed in any particular embodiment.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

Disclosed is a foldable easel blank and associated methods, systems, devices, and various apparatus. The foldable easel blank includes a main panel, a support panel, a base panel, a first side panel, and a second side panel. It would be understood by one of skill in the art that the disclosed foldable easel blank is described in but a few exemplary embodiments among many. No particular terminology or description should be considered limiting on the disclosure or the scope of any claims issuing therefrom.

Figure 6:
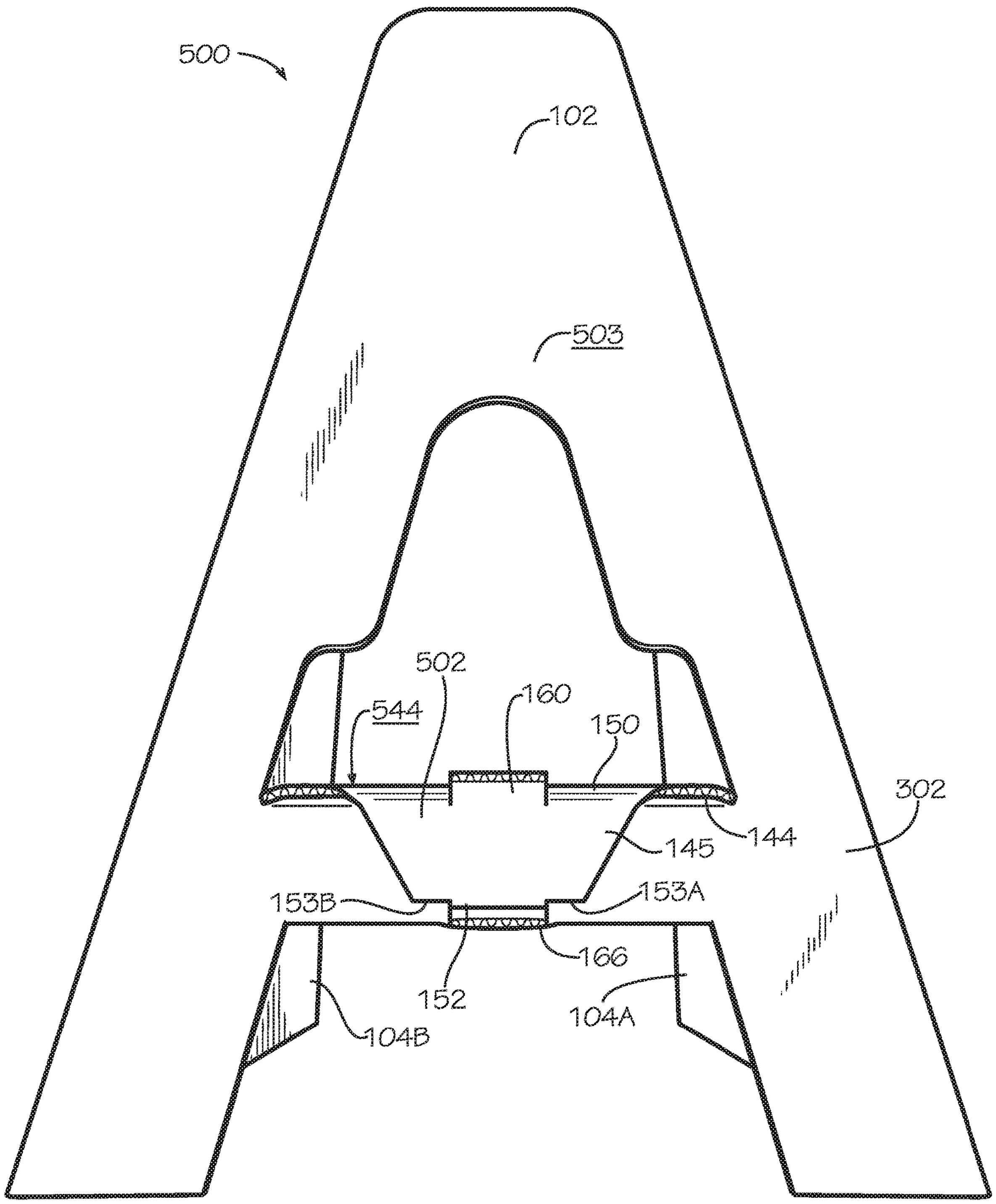
FIG. 6 is a front view of the folded easel of FIG. 5 in the upright position.

One embodiment of a foldable easel blank 100 is disclosed in FIG. 1. FIG. 1 shows a top view of the foldable easel blank 100 in an unfolded position. The foldable easel blank 100 is symmetrical across a center line 105. The foldable easel blank 100 comprises a main panel 102, a first side panel 104A, a second side panel 104B, a support panel 108, and a base panel 110. The foldable easel blank defines a front blank surface (not shown) and a rear blank surface 101. The front blank surface is opposite from and substantially parallel to the rear blank surface 101. Both the front blank surface and the rear blank surface 101 can be substantially planar. The main panel 102 has a top 112, a first side 114A, a second side 114B, and a bottom 118. The first side 114A is positioned opposite from the second side 114B. The bottom defines a bottom main surface 138. The main panel 102 defines a front main surface 403 (shown in FIG. 4) and a rear main surface 103. The front main surface 403 is opposite from and substantially parallel to the rear main surface 103. Both the front main surface 403 and rear main surface 103 can be substantially planar. In some embodiments, the main panel 102 defines an A-shape as shown in FIG. 6; however, the shape should not be viewed as limiting, and the main panel 102 can have any shape such as rectangular, trapezoidal, triangular, etc. The main panel 102 can define a locking aperture 166 extending from the front main surface 403 to the rear main surface 103. The locking aperture 166 can have a rectangular shape; however the shape should not be viewed as limiting. In the embodiment shown, the locking aperture 166 can be disposed adjacent to the base panel 110.

As shown in FIG. 1, the base panel 110 is disposed proximate the bottom 118 of the main panel 102 between the first side 114A and the second side 114B. A first base end 136 of the base panel 110 can be hingedly connected to the main panel 102 by a base hinge 120. A second base end 137 is positioned opposite from the first base end 136. The base hinge 120 can be a living hinge configured to fold about a base hinge axis 121. A first base side 133A can be defined proximate to the first side 114A by a first base panel cutout 132A. The first base panel cutout 132A is defined by the main panel 102 and extends from the front main surface 403 to the rear main surface 103. A second base side 133B can be defined proximate to the second side 114B by a second base panel cutout 132B. The second base panel cutout 132B is defined by the main panel 102 and extends from the front main surface 403 to the rear main surface 103. A portion of the main panel 102 between the first base panel cutout 132A and the first side 114A defines a first leg 128A, and a portion of the main panel 102 between the second base panel cutout 132B and the second side 114B defines a second leg 128B. The second base end 137 defines a first corner 140A and a second corner 140B. The first corner 140A is disposed proximate the first base side 133A, and the second corner 140B is disposed proximate the second base side 133B. The shape of the first corner 140A and the second corner 140B should not be viewed as limiting, and the first corner 140A and the second corner 140B could be rounded, chamfered, pointed, or any other shape. The second base end 137 also defines a bottom base surface 139. In some embodiments, the bottom base surface 139 can be coplanar with the bottom main surface 138.

As shown in FIG. 1, the support panel 108 comprises a ledge subpanel 144 and a locking subpanel 145. The support panel 108 can be defined by a support panel cutout 156 which is defined by the main panel 102. The support panel cutout 156 extends from the front main surface 403 to the rear main surface 103. The support panel 108 defines a front support surface 464 (shown in FIG. 4) and a rear support surface 164. The rear support surface 164 is positioned opposite from and substantially parallel to the front support surface 464. The ledge subpanel 144 can define a first ledge end 146 and a second ledge end 147. The first ledge end 146 is positioned opposite from the second ledge end 147. The first ledge end 146 is hingedly connected to the main panel 102 by a support hinge 122. The support hinge 122 can be a living hinge configured to fold about a support axis 123. The ledge subpanel 144 can define a pair of ledge shoulders 165A,B disposed at the second ledge end 147. The ledge shoulders 165A,B may comprise a rounded transition surface between the ledge subpanel 144 and the locking subpanel 145.

As shown in FIG. 1, the locking subpanel 145 can define a first locking end 148 and a second locking end 149. The first locking end 148 can be positioned opposite from the second locking end 149. The first locking end 148 can be hingedly connected to the second ledge end 147 by a subpanel hinge 150. The subpanel hinge 150 can be a living hinge configured to fold about a subpanel axis 151. In some embodiments, the support axis 123, the subpanel axis 151, and the base hinge axis 121 can be substantially parallel to one another. The second locking end 149 can define a locking tab 152. The locking tab 152 is configured to engage the locking aperture 166. The second locking end 149 can further define a pair of locking shoulders 153A,B adjacent to the locking tab 152, wherein the locking tab 152 is positioned between the locking shoulders 153A,B. The support panel cutout 156 and the second locking end 149 can define a clearance aperture 162. The first locking end 148 can further define a retention tab 160. The retention tab 160 can be formed by a retention tab cutout 158 extending from the front support surface 464 to the rear support surface 164.

As shown in FIG. 1, the first side panel 104A can be hingedly connected to the first side 114A of the main panel 102 by a first side hinge 124A. The first side hinge 124A can be a living hinge configured to fold about a first side axis 168A. In the embodiment shown, the first side axis 168A is substantially collinear with a first side edge 170A. The first side panel 104A comprises a first side bottom 172A which defines a first side bottom surface 174A. The first side panel 104A defines a front first side surface 780A (shown in FIG. 7) and a rear first side surface 180A which is parallel to the front first side surface 780A. The front first side surface 780A is positioned opposite from the rear first side surface 180A. The first side panel 104A defines a first side aperture 182A extending from the front first side surface 780A to the rear first side surface 180A. The first side aperture 182A comprises a first bore 188, a pair of first notches 183A,B, and a pair of first aperture slits 186A,B. The first bore 188 is disposed between the pair of first notches 183A,B. The pair of first notches 183A,B is disposed between the pair of first aperture slits 186A,B. In some embodiments, the first side aperture 182A can simply be a single elongated notch without the first bore 188. The shape of the first side aperture 182A should not be viewed as limiting and could be rectangular, oval, square, or any other shape.

As shown in FIG. 1, the second side panel 104B can be hingedly connected to the second side 114B of the main panel 102 by a second side hinge 124B. The second side hinge 124B can be a living hinge configured to fold about a second side axis 168B. In the embodiment shown, the second side axis 168B is collinear with a second side edge 170B. The second side panel 104B comprises a second side bottom 172B which defines a second side bottom surface 174B. The second side panel 104B defines a front second side surface 780B (shown in FIG. 7) and a rear second side surface 180B which is parallel to the front second side surface 780B. The front second side surface 780B is positioned opposite from the rear second side surface 180B. The second side panel 104B defines a second side aperture 182B extending from the front second side surface 780B to the rear second side surface 180B. The second side aperture 182B comprises a second bore 188B, a pair of second notches 183C,D, and a pair of second aperture slits 186C,D. The second bore 188B is disposed between the pair of second notches 183C,D. The pair of second notches 183C,D is disposed between the pair of second aperture slits 186C,D. In some embodiments, the second side aperture 182B can simply be a single elongated notch without the second bore 188B. The shape of the second side aperture 182B should not be viewed as limiting and could be rectangular, oval, square, or any other shape. The first side panel 104A and the second side panel 104B can be substantially triangular in shape; however the shape should not be viewed as limiting. In other embodiments, the first side panel 104A and second side panel 104B can have other shapes such as trapezoidal, quadrilateral, or any other shape.

The first side aperture 182A and the second side aperture 182B are configured to receive the first corner 140A and the second corner 140B, respectively. The first bore 188A and the second bore 188B are wider than the pair of first notches 183A,B and the pair of second notches 183C,D. The first bore 188A and the second bore 188B are configured to aid in introducing the first corner 140A and the second corner 140B into the pair of first notches 183A,B and the and the pair of second notches 183C,D, respectively. As the first corner 140A and the second corner 140B are inserted further into the first side aperture 182A and the second side aperture 182B, the pair of first aperture slits 186A,B and the pair of second aperture slits 186C,D frictionally engage the first corner 140A and second corner 140B, respectively. The frictional engagement secures the respective corner 140A,B in the respective side aperture 182A, 182B, thereby securing the base panel 110 to the first side panel 104A and the second side panel 104B. In some embodiments, the first corner 140A and the second corner 140B can define a notch, a barb, an arrowhead shape, a hinged tab, or other shape configured to secure the respective corner 140A,B in the respective side aperture 182A, 182B.

Figure 4:
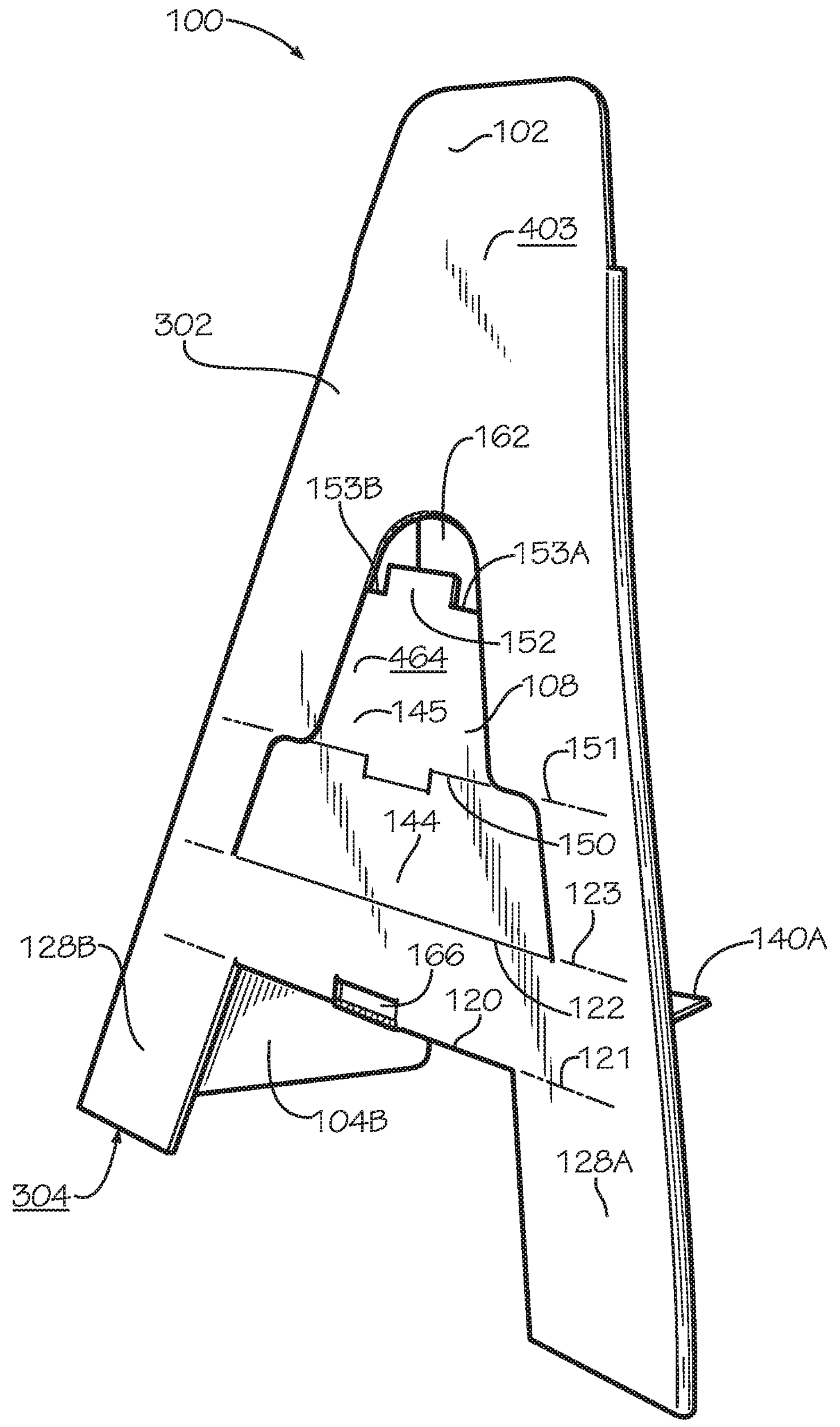
FIG. 4 is a perspective view of the foldable easel blank of FIG. 1 folded to form a base stand in an upright position.
Figure 5:
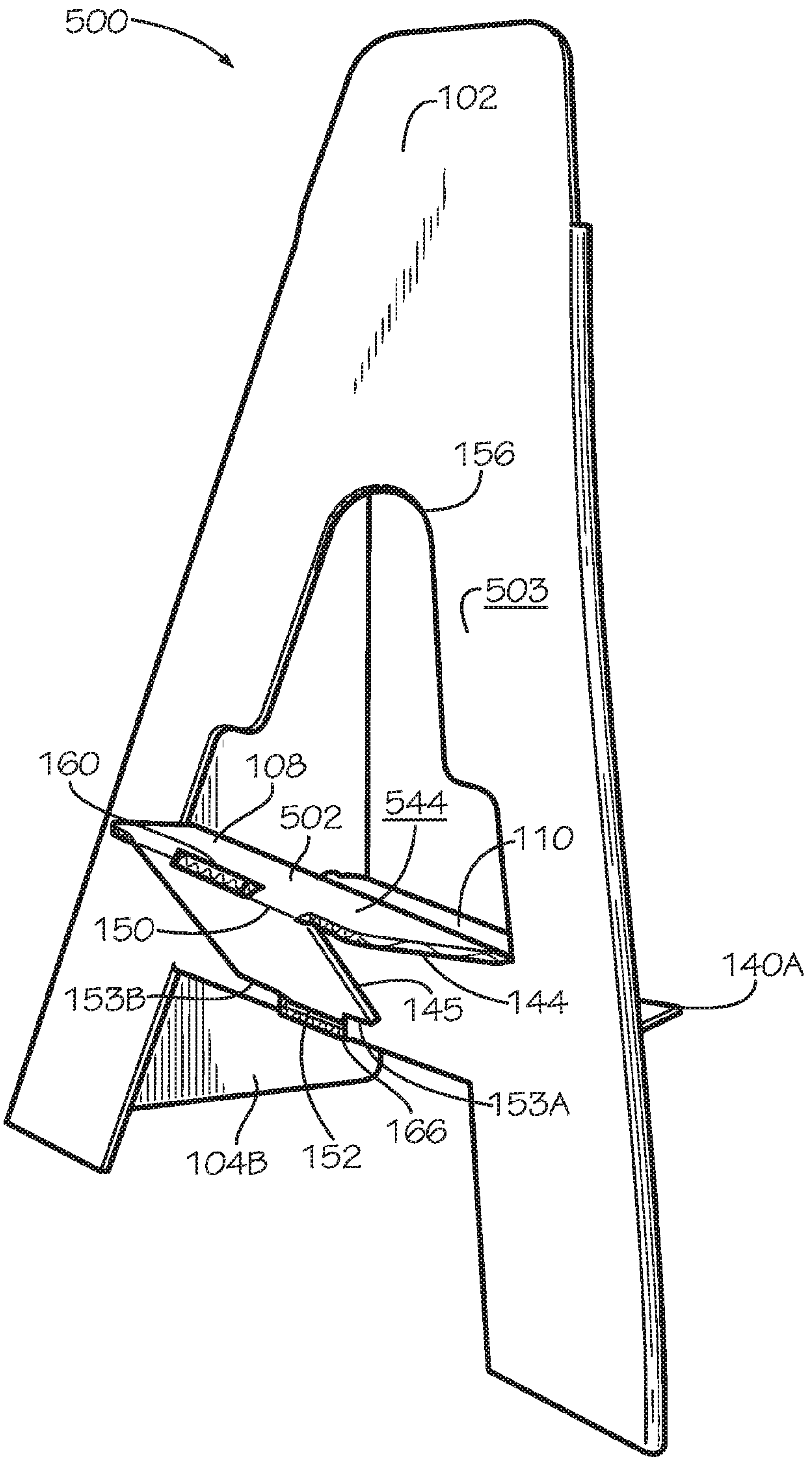
FIG. 5 is a perspective view of a folded easel assembled from the foldable easel blank of FIG. 1.

The foldable easel blank 100 can be folded in order to assemble a folded easel 500 as shown in FIG. 5. FIGS. 2-5 depict one possible sequence through which the folded easel 500 can be assembled from the foldable easel blank 100. However, there are numerous sequences in which the folded easel 500 can be assembled, and the specific sequence is not intended to be limiting.

Figure 2:
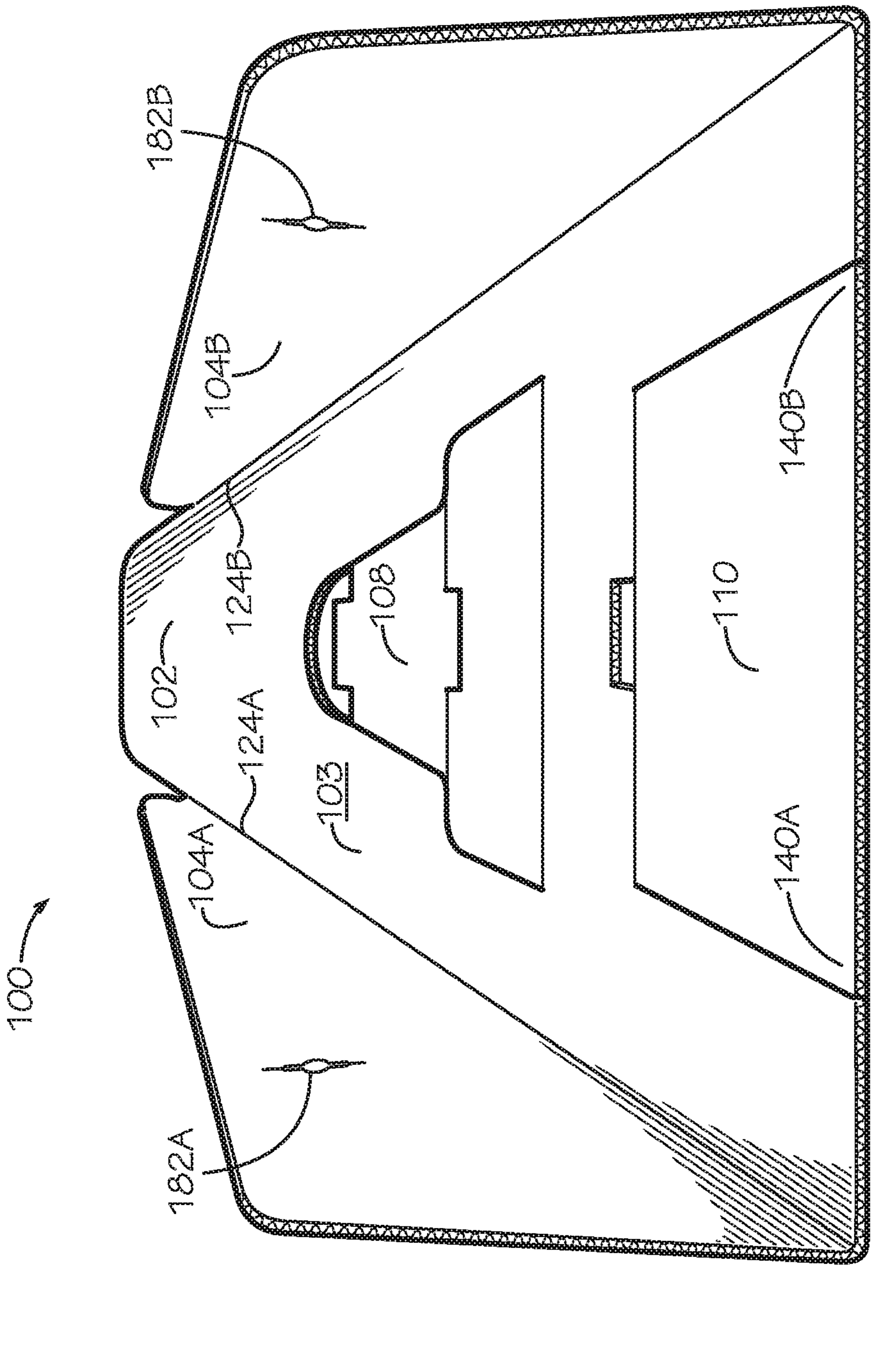
FIG. 2 is a perspective view of the foldable easel blank of FIG. 1 in a partially folded position.

FIG. 2 shows a perspective view of the foldable easel blank 100 in a partially folded position with the first side panel 104A folded about the first side hinge 124A towards the rear main surface 103 of the main panel 102 and the second side panel 104B folded about the second side hinge 124B towards the rear main surface 103 of the main panel 102. The position shown is an intermediate position, and the position should not be considered limiting.

Figure 3:
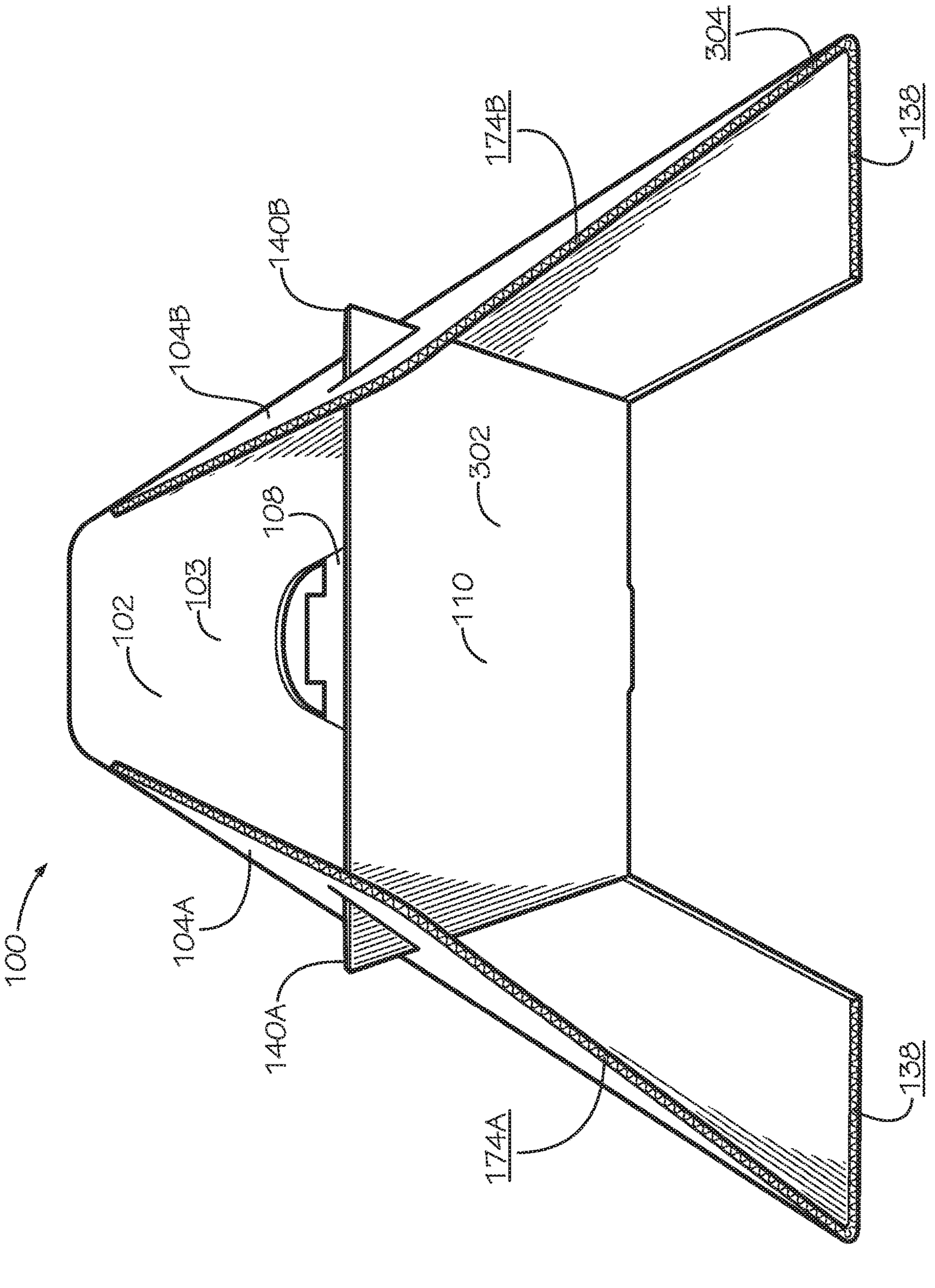
FIG. 3 is a perspective view of the foldable easel blank of FIG. 1 folded to form a base stand.

FIG. 3 shows a perspective view of the foldable easel blank 100 with the base panel 110 folded about the base hinge 120 towards the rear main surface 103 of the main panel 102 to form the base stand 302. In this configuration, the base panel 110 extends outwards from the rear main surface 103. The first corner 140A has been aligned with the first side aperture 182A and then inserted into the first side aperture 182A by folding the first side panel 104A about the first side hinge 124A towards the base panel 110. In the position shown, the first corner 140A has been inserted until the first aperture slits 186A,B frictionally engage the first corner 140A, thereby securing the base panel 110 to the first side panel 104A. Similarly, the second corner 140B has been aligned with the second side aperture 182B and then inserted into the second side aperture 182B by folding the second side panel 104B about the second side hinge 124B towards the base panel 110. In the position shown, the second corner 140B has been inserted until the second aperture slits 186C,D frictionally engage the second corner 140B, thereby securing the base panel 110 to the second side panel 104B. Securing the base panel 110 to both the first side panel 104A and the second side panel 104B forms the base stand 302 of the folded easel 500 (shown in FIG. 5). The bottom main surface 138, first side bottom surface 174A, and the second side bottom surface 174B together define a base surface 304.

FIG. 4 shows a perspective view of the foldable easel blank 100 assembled into the base stand 302 in an upright position resting on the base surface 304. The base stand 302 is configured to stand in an upright position as shown when placed on the base surface 304. In the upright position, the support axis 123, the subpanel axis 151, and the base hinge axis 121 are substantially horizontal. The base stand 302 and base surface 304 are configured to provide stable support for the folded easel 500. The first corner 140A can be seen extending through the first side panel 104A, thereby securing the base panel 110 to the first side panel 104A as previously described. In the configuration shown, a ledge 502 of the folded easel 500 (shown in FIG. 5) has not yet been assembled from the support panel 108. To assemble the ledge 502, the support panel 108 can be folded out of the support panel cutout 156 towards the front main surface 403 of the main panel 102, as follows. First, the locking subpanel 145 can be folded about the subpanel hinge 150 relative to the ledge subpanel 144 and in a direction towards the front main surface 403. The clearance aperture 162 allows a user to insert a finger through the clearance aperture 162 in order to grab the locking subpanel 145 and fold the locking subpanel 145 towards the front main surface 403. Secondly, the ledge subpanel 144 can be folded about the support hinge 122 towards the front main surface 403 which positions the locking tab 152 proximate the locking aperture 166. The user can then insert the locking tab 152 into the locking aperture 166 until the locking shoulders 153A,B contact the front main surface 403. This assembly sequence produces the folded easel 500 shown in FIG. 5. The sequence described is only one possible sequence and should not be viewed as limiting. Steps can be performed in a different order to achieve the same results.

FIG. 5 shows a perspective view of the folded easel 500 assembled from the foldable easel blank 100. The support panel 108 has been folded about the support hinge 122 towards the front main surface 403 to form the ledge 502. As shown, the locking tab 152 is inserted into the locking aperture 166 with the locking shoulders 153A,B contacting the front main surface 403. The ledge 502 can extend outwards from the front main surface 403 as shown. In this configuration, a ledge surface 544 defined by the ledge subpanel 144 of the ledge 502 can support a work piece, such as a canvas, to allow the user to work on the work piece, such as painting or drawing on the canvas. When a load is placed on the ledge surface 544, the locking shoulders 153A,B are configured to press against the front main surface 403 to support the load. The load also presses the locking tab 152 into the locking aperture 166 to ensure engagement between the locking tab 152 and the locking aperture 166, thereby preventing the ledge 502 from disassembling while under load.

The ledge 502 comprises the retention tab 160 which extends away from the ledge subpanel 144. The retention tab 160 is defined by the locking subpanel 145, and folding the locking subpanel 145 about the subpanel hinge 150 relative to the ledge subpanel 144 extends the retention tab 160 away from the retention tab cutout 158 of the ledge subpanel 144. The retention tab is configured to retain the work piece on the ledge surface 544 by preventing the work piece from sliding away from the front main surface 403 and off of the ledge 502. A portion of the front main surface 403 disposed above the ledge 502 and on both sides of the support panel cutout 156 defines a backing surface 503. When placed on the ledge surface 544, the work piece rests against the backing surface 503. The backing surface 503 can be wider than the ledge surface 544. In some embodiments, the ledge surface 544 can be substantially perpendicular to the backing surface 503. The ledge surface 544 can be substantially planar.

FIG. 6 depicts a front view of the folded easel 500 in an upright position. As previously described, the main panel 102 can be A-shaped. The first base panel cutout 132A, the second base panel cutout 132B, and the support panel cutout 156 partially define the A-shape. FIG. 6 shows the retention tab 160 defined by the locking subpanel 145 extending outwards from the ledge subpanel 144. FIG. 6 also shows the locking tab 152 engaging the locking aperture 166 with the locking tab 152 disposed between the locking shoulders 153A,B. As previously described, placing the load on the ledge surface 544 presses the locking shoulders 153A,B against the front main surface 403.

Figure 7:
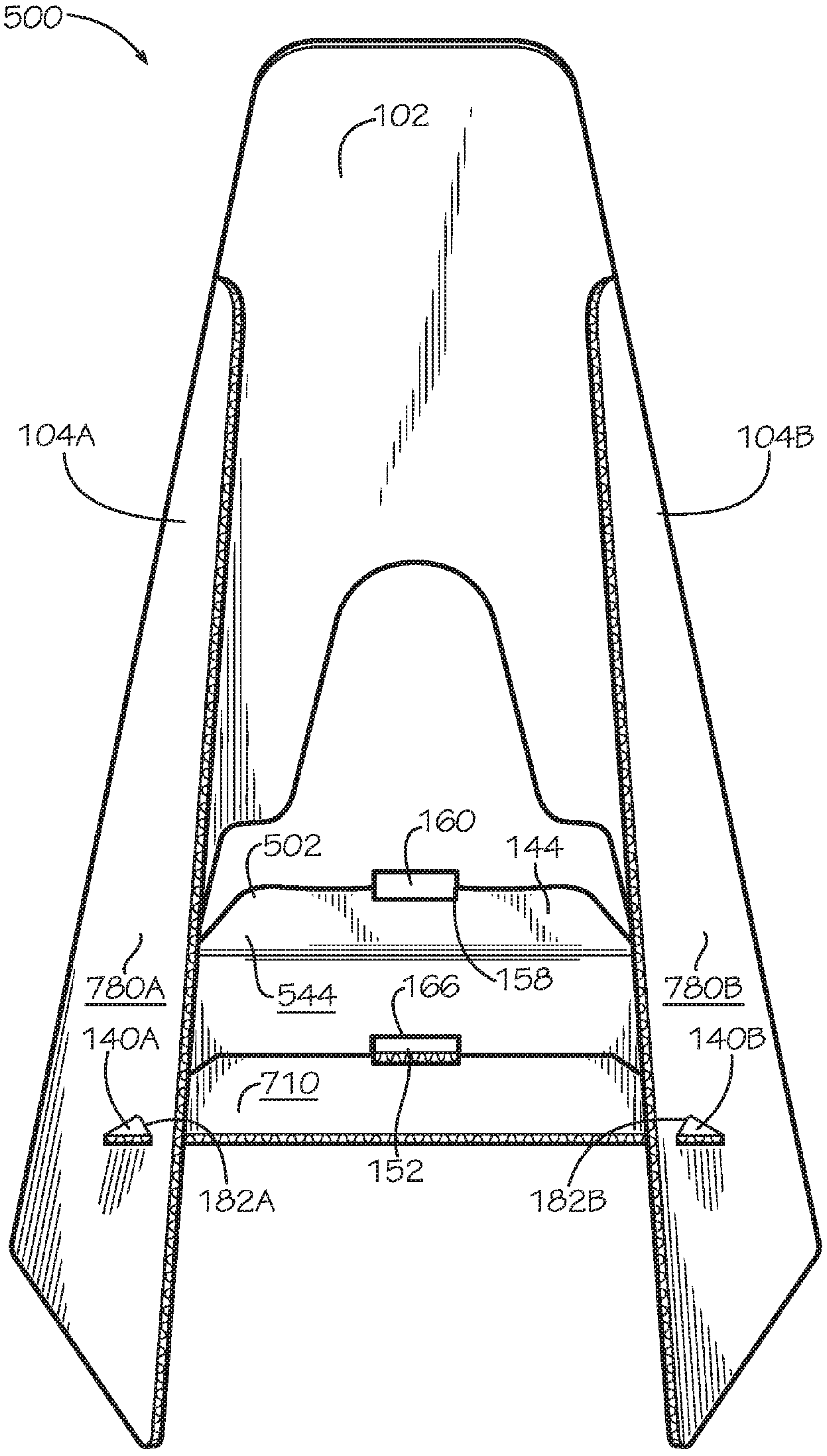
FIG. 7 is a rear view of the folded easel of FIG. 5 in the upright position.

FIG. 7 shows a rear view of the folded easel 500 in the upright position. The front first side surface 780A of the first side panel 104A and the front second side surface 780B of the second side panel 104B are shown from the rear. The first corner 140A is inserted through the first side aperture 182A and extends away from the front first side surface 780A. The second corner 140B is inserted through the second side aperture 182B and extends away from the front second side surface 780B. The locking tab 152 is shown inserted through the locking aperture 166. In some embodiments, the locking tab 152 can contact the base panel 110 on a rear base surface 710. The rear base surface 710 of the base panel 110 can be planar and substantially horizontal. In some embodiments, a bottom edge of the locking aperture 166 can be defined by the base panel 110. The bottom edge of the locking aperture 166 can be substantially collinear with the base hinge axis 121.

Figure 8:
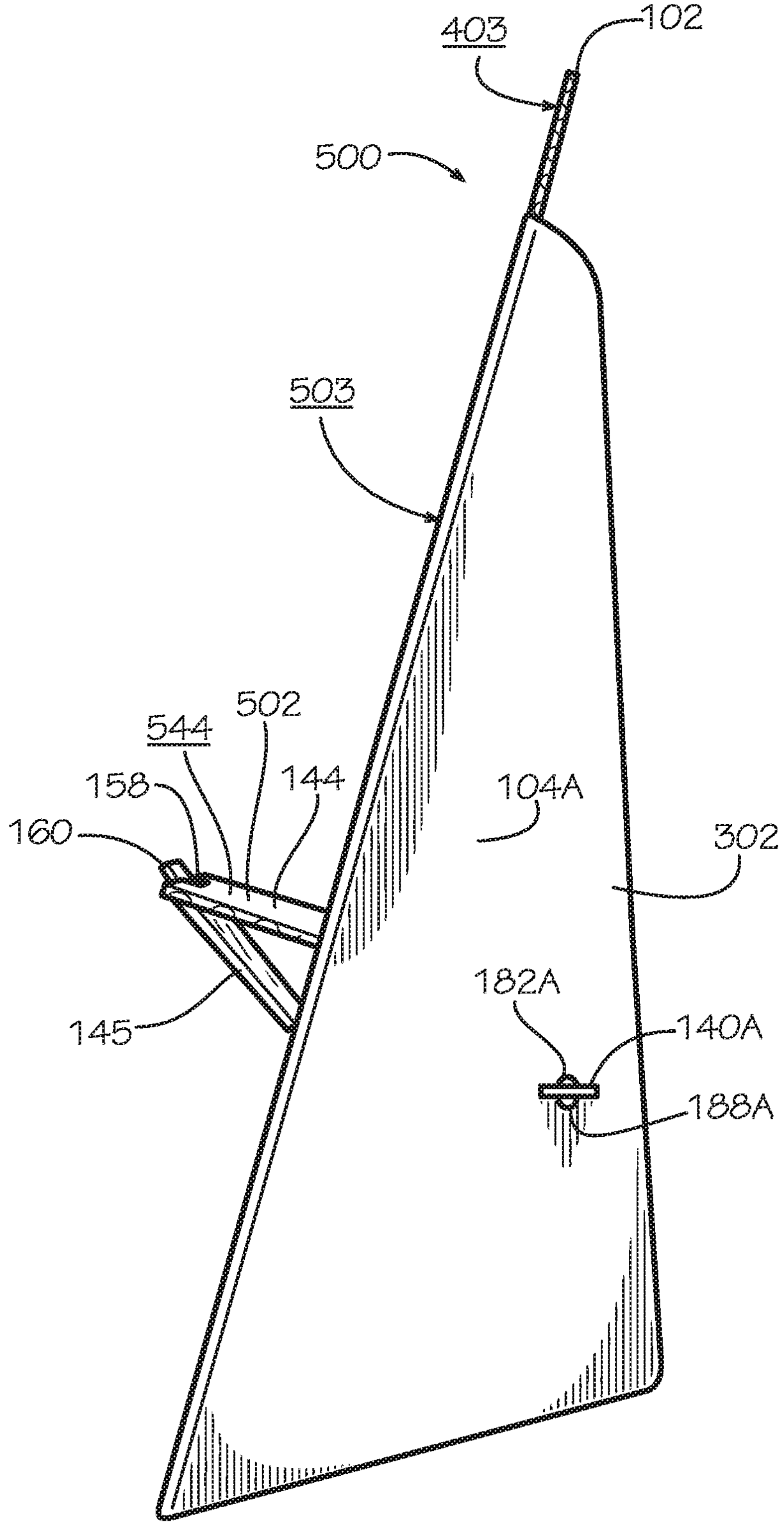
FIG. 8 is a side view of the folded easel of FIG. 5 in the upright position facing a first side panel.
Figure 9:
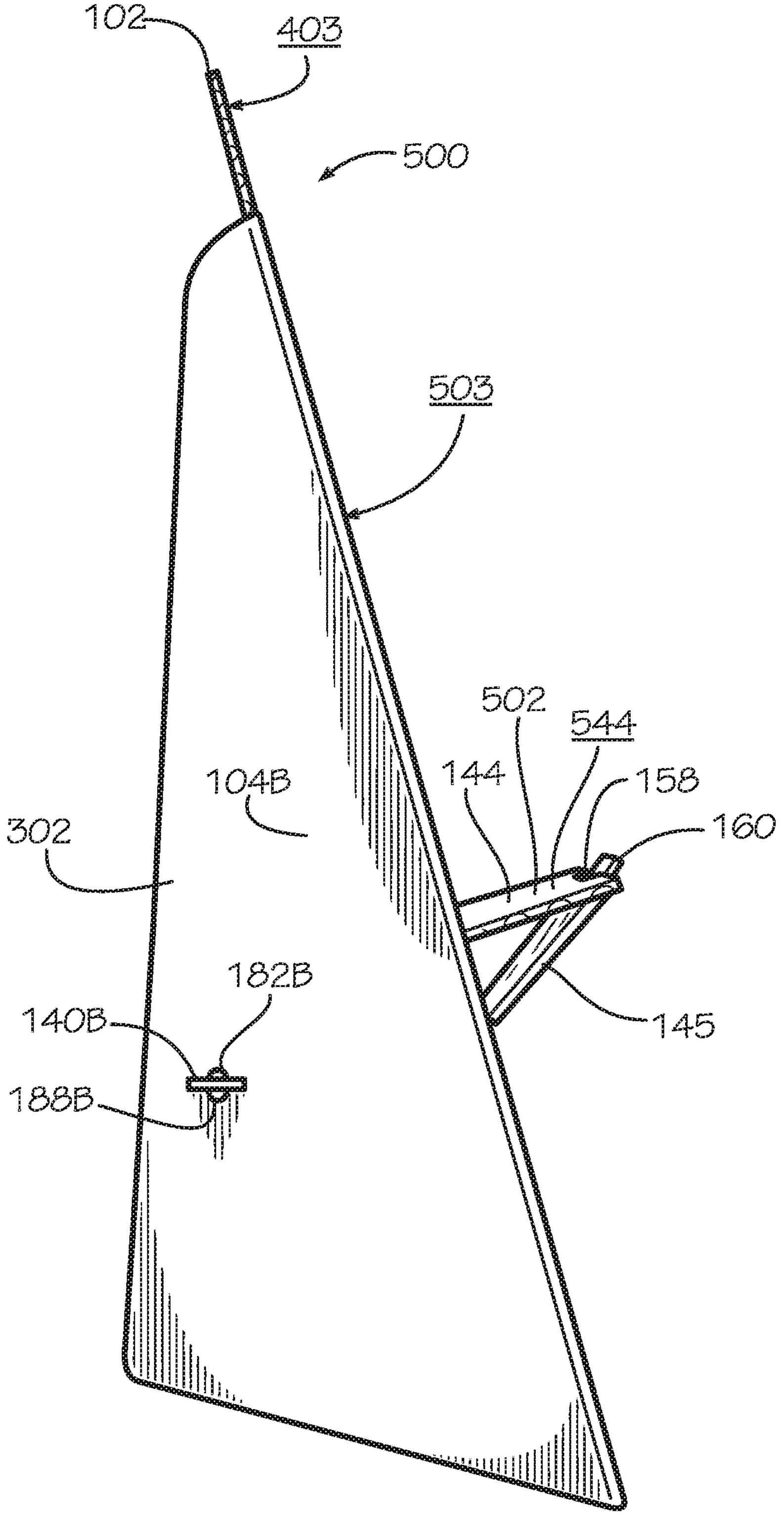
FIG. 9 is a side view of the folded easel of FIG. 5 in the upright position facing a second side panel.

FIG. 8 shows a side view of the folded easel 500 facing the first side panel 104A, and FIG. 9 shows a side view of the folded easel 500 facing the second side panel 104B. The ledge 502 extends outwards from the front main surface 403 of the main panel 102, and the ledge surface 544 can be substantially perpendicular to the front main surface 403.

However, in various other embodiments, an angle between the ledge surface 544 and the front main surface 403 can be either obtuse or acute. The ledge 502 can define a triangular cross-sectional shape formed by the folded support panel 108. The retention tab 160 is shown extending outwards from the ledge subpanel 144 and away from the retention tab cutout 158.

Figure 10:
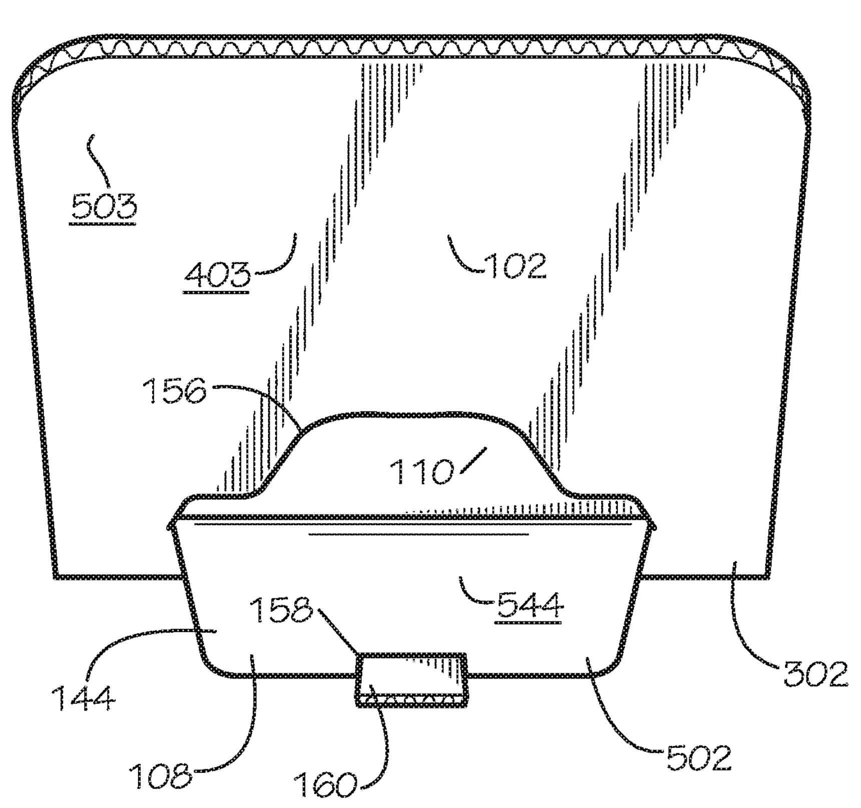
FIG. 10 is a top view of the folded easel of FIG. 5 in the upright position.

FIG. 10 shows a top view of the folded easel 500 in the upright position. As previously described, the backing surface 503 is disposed above and on either side of the ledge surface 544. Together the backing surface 503 and the ledge surface 544 are configured to support the work piece. The retention tab 160 is shown extending outwards from the ledge subpanel 144 and is configured to retain the work piece on the ledge 502. The base panel 110 can be seen through the support panel cutout 156.

Figure 11:
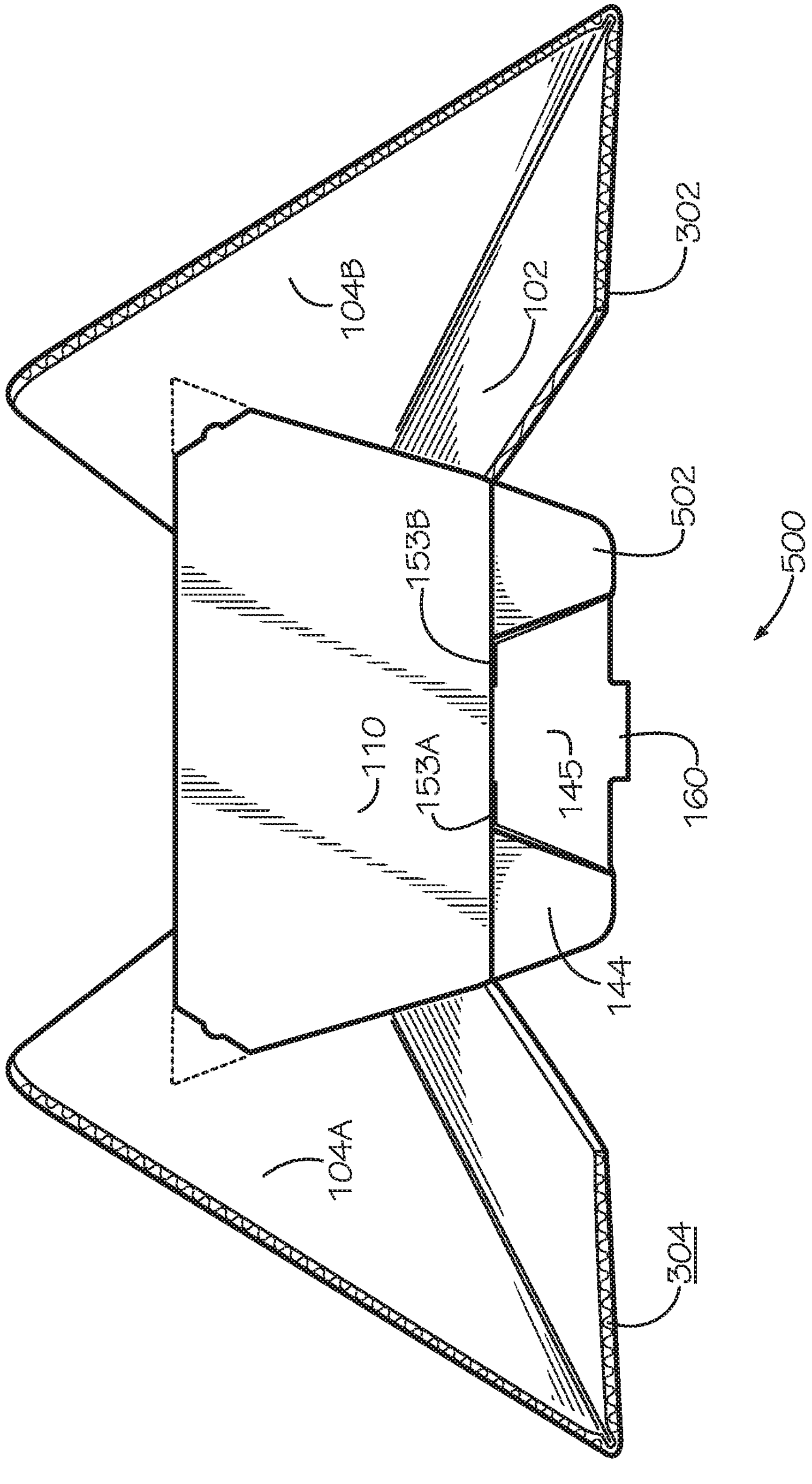
FIG. 11 is a bottom view of the folded easel of FIG. 5 in the upright position.

FIG. 11 shows a bottom view of the folded easel 500 in the upright position, showing the base surface 304 of the base stand 302. The base panel 110 is secured to the first side panel 104A and the second side panel 104B. The base panel 110 extends away from the rear main surface 103. The ledge 502 is extending outwards from the front main surface 403. The locking shoulders 153A,B are shown pressing against the front main surface 403.

Figure 12:
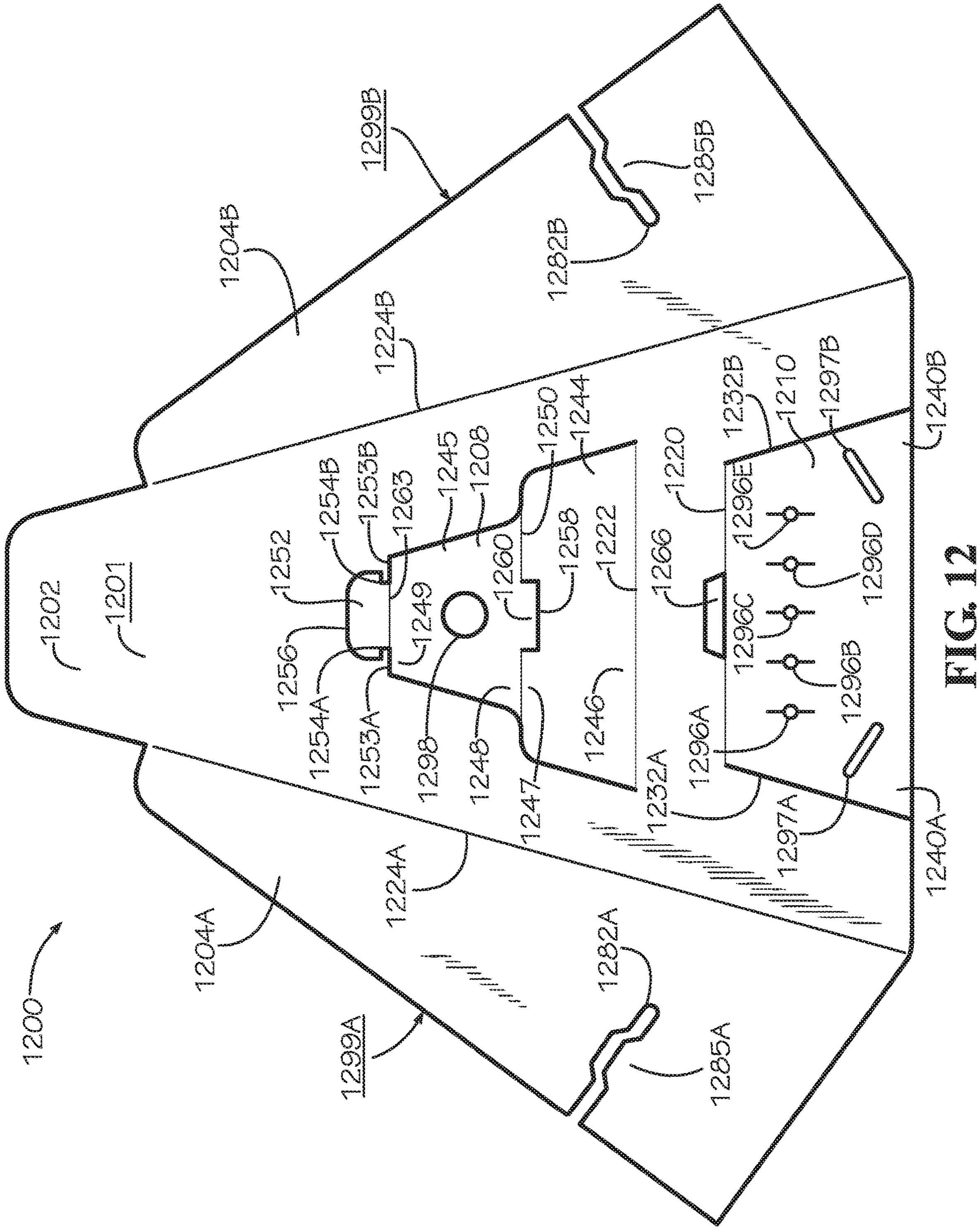
FIG. 12 is a top view of another embodiment of a foldable easel blank.

FIG. 12 shows a top view of another embodiment of a foldable easel blank 1200 facing a rear blank surface 1201 of the foldable easel blank 1200. Similar to the embodiment of the foldable easel blank 100, the embodiment of the foldable easel blank 1200 comprises a main panel 1202, a support panel 1208, a first side panel 1204A, a second side panel 1204B, and a base panel 1210. The first side panel 1204A is hingedly connected to the main panel 1202 by a first side hinge 1224A, and the second side panel 1204B is hingedly connected to the main panel 1202 by a second side hinge 1224B. The support panel 1208 is hingedly connected to the main panel 1202 by a support hinge 1222. The base panel 1210 is hingedly connected to the main panel 1202 by a base hinge 1220. The main panel 1202 defines a locking aperture 1266 adjacent to the base panel 1210. In the embodiment shown, a bottom edge of the locking aperture can be collinear with an axis of the base hinge 1220. The locking aperture 1266 has a trapezoidal shape, but the shape should not be viewed as limiting, and the locking aperture 1266 can have any other shape such as an elongated slot, a rectangle, an oval, a square, or any other shape.

The base panel 1210 is defined by a first base panel cutout 1232A and a second base panel cutout 1232B, each extending through the main panel 1202. The base panel 1210 defines a first corner 1240A positioned opposite from the base hinge 1220 and proximate to the first base panel cutout 1232A. The first corner 1240A defines a first locking slot 1297A extending through the base panel 1210. The base panel 1210 also defines a second corner 1240B positioned opposite from the base hinge 1220 and proximate to the second base panel cutout 1232B. The second corner 1240B defines a second locking slot 1297B extending through the base panel 1210. The base panel 1210 can also define a plurality of tool holders 1296A,B,C,D,E. The quantity and shape of the tool holders 1296 should not be viewed as limiting. In this embodiment, the tool holders 1296 are each defined by a circular aperture disposed between a pair of slits. Each circular aperture and pair of slits extends through the base panel 1210. Each tool holder 1296 is configured to receive and frictionally engage a tool handle, such as the handle of a paint brush, mahl stick, or other tool.

The support panel 1208 is defined by a support panel cutout 1256 which extends through the main panel 1202. The support panel 1208 comprises a ledge subpanel 1244 which defines a first ledge end 1246 and a second ledge end 1247 positioned opposite from the first ledge end 1246. The support panel 1208 also comprises a locking subpanel 1245 which defines a first locking end 1248 and a second locking end 1249 positioned opposite from the first locking end 1248. The ledge subpanel 1244 is hingedly connected to the main panel 1202 at the first ledge end 1246 by the support hinge 1222. The first locking end 1248 of the locking subpanel 1245 is hingedly connected by a subpanel hinge 1250 to the second ledge end 1247 of the ledge subpanel 1244. The locking subpanel 1245 can define an aperture 1298 extending through the locking subpanel 1245. The first locking end 1248 can define a retention tab 1260. The retention tab 1260 can be formed by a retention tab cutout 1258 extending through the support panel 1208. When folded to form a ledge, the retention tab 1260 is configured to retain a work piece on the ledge.

The second locking end 1249 defines a locking tab 1252 which is hingedly connected at the second locking end 1249 by a locking tab hinge 1263. The locking tab 1252 and the locking tab hinge 1263 are positioned between a pair of locking shoulders 1253A,B defined by the second locking end 1249. The locking tab 1252 is configured to engage the locking aperture 1266 in order to form a ledge, similar to the ledge 502 of the folded easel 500. The locking tab 1252 also defines a pair of locking notches 1254A,B positioned proximate to the locking shoulders 1253A,B. The locking notches 1254A,B are configured to retain the locking tab 1252 in the locking aperture 1266 once the locking tab 1252 has engaged the locking aperture 1266. The locking shoulders 1253A,B limit a depth of insertion of the locking tab 1252 into the locking aperture 1266, and the locking notches 1254A,B prevent the locking tab 1252 from accidentally pulling out of the locking aperture 1266.

As shown in this embodiment of the foldable easel blank 1200, the first side panel 1204A defines a first side aperture 1282A. In this embodiment, the first side aperture 1282A extends to a first side edge surface 1299A. The first side edge surface 1299A is defined by the first side panel 1204A distal from the main panel 1202. In other embodiments, the first side aperture 1282A may not extend to the first side edge surface 1299A and can instead form a closed slot. The first side aperture 1282A defines a first locking key 1285A configured to engage the first locking slot 1297A. The second side panel 1204B of the foldable easel blank 1200 defines a second side aperture 1282B. In this embodiment, the second side aperture 1282B extends to a second side edge surface 1299B. The second side edge surface 1299B is defined by the second side panel 1204B distal from the main panel 1202. In other embodiments, the second side aperture 1282B may not extend to the second side edge surface 1299B and can instead form a closed slot. The second side aperture 1282B defines a second locking key 1285B configured to engage the second locking slot 1297B.

The first side aperture 1282A is configured to receive the first corner 1240A of the base panel 1210, and the second side aperture 1282B is configured to receive the second corner 1240B of the base panel 1210. Upon inserting each corner 1240A,B into the respective side aperture 1282A,B, the respective locking key 1285A,B engages the respective locking slot 1297A,B in order to secure the first side panel 1204A and the second side panel 1204B to the base panel 1210. With the side panels 1204A,B secured to the base panel 1210, a base stand is formed, similar to the base stand 302 of the folded easel 500.

The foldable easel blanks 100,1200 can be comprised of a sheet of corrugated cardboard which is economical and lightweight. Forming the foldable easel blanks 100,1200 from a single sheet of corrugated cardboard can also lower manufacturing costs. The various cutouts 156, 158, 132A,B, 1256, 1258, 1232A,B, and apertures 166, 182A,B, 1266, 1282A,B, 1296A,B,C,D,E, and 1298 can all be formed by a die-cut. However, the material should not be viewed as limiting, and the foldable easel blanks 100,1200 can be comprised of plastic, paper, metal, or any other material. The foldable easel blanks 100,1200 can be shipped, stored, and sold in stores as a flat blank. The flat blank can easily be stored such as by stacking several foldable easel blanks 100 on top of one another. The foldable easel blank 100 can be folded to form the folded easel 500 when desired for use by the user. Upon completion of the project, the folded easel 500 can be disassembled or unfolded into the form of the foldable easel blank 100, such as for storage. When in the folded easel 500 configuration, the base surface 304 of the base stand 302 can be placed on a horizontal surface such as a tabletop or the ground, and the folded easel 500 will stand in the upright position. The user can then place the work piece, such as the canvas, on the ledge surface 544 of the ledge 502 with the work piece resting against the backing surface 503. In this position, the work piece is stable, and the user can draw or paint the work piece without supporting or stabilizing the work piece.

The method for assembling the folded easel 500 comprises obtaining a foldable easel blank 100, folding the first side panel 104A about the first side hinge axis 168A towards the rear main surface 103, folding the second side panel 104B about the second side hinge axis 168B towards the rear main surface 103, folding the base panel 110 about the base hinge axis 121 towards the rear main surface 103, forming a base stand 302, and folding the support panel 108 about the support hinge axis 123 towards the front main surface 403 to form the ledge 502. Forming the base stand 302 can comprise securing the base panel 110 to the first side panel 104A and the second side panel 104B. Securing the base panel 110 to the first side panel 104A can comprise inserting the first corner 140A into the first side aperture 182A. Securing the base panel 110 to the second side panel 104B can comprise inserting the second corner 140B into the second side aperture 182B. The method can further comprise inserting the locking tab 152 defined by the support panel 108 into the locking aperture 166 defined by the main panel 102. Folding the support panel can comprise folding the locking subpanel 145 about the subpanel hinge axis 151 relative to the ledge subpanel 144 until the locking subpanel 145 contacts the front main surface 403 of the main panel 102.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure. Moreover, although specific terms are employed herein, as well as in the claims which follow, they are used only in a generic and descriptive sense, and not for the purposes of limiting the present disclosure, nor the claims which follow.

That which is claimed is:

1. A foldable easel blank comprising:

a main panel defining a first side and a second side, the first side positioned opposite from the second side, the main panel defining a locking aperture extending through the main panel from a front main surface to a rear main surface, the front main surface positioned opposite from the rear main surface;

a support panel hingedly connected to the main panel, the support panel defining a locking tab configured to engage the locking aperture;

a first side panel hingedly connected to the first side of the main panel by a first side hinge;

a second side panel hingedly connected to the second side of the main panel by a second side hinge; and a base panel positioned between the first side hinge and the second side hinge, the base panel configured to engage the first side panel and the second side panel to form a base stand; and wherein:

the main panel defines a top and a bottom;

the base panel is hingedly connected to the main panel by a base hinge;

a first base panel cutout extends from the bottom to the base hinge;

a second base panel cutout extends from the bottom to the base hinge;

a first leg is defined between the first base panel cutout and the first side hinge;

a second leg is defined between the second base panel cutout and the second side hinge;

the base panel is positioned between the first leg and the second leg;

the first leg and the second leg define a bottom main surface at the bottom;

the base panel defines a bottom base surface at the bottom; and the bottom main surface is substantially coplanar with the bottom base surface.

2. The foldable easel blank of claim 1, wherein:

the first side panel defines a first front surface and a first rear surface;

the first front surface is positioned opposite from the first rear surface;

the first side panel defines a first side aperture extending from the first front surface to the first rear surface; and the first side aperture is configured to receive a first corner of the base panel.

3. The foldable easel blank of claim 2, wherein:

the base panel defines an enclosed locking slot disposed proximate to the first corner;

the first side panel defines a first locking key disposed within the first side aperture; and the first locking key is configured to engage the enclosed locking slot when the first corner of the base panel is inserted through the first side aperture of the first side panel.

4. The foldable easel blank of claim 1, wherein the support panel comprises:

a ledge subpanel defining a first ledge end and a second ledge end, the first ledge end positioned opposite from the second ledge end, the first ledge end hingedly connected to the main panel; and a locking subpanel defining a first locking end and a second locking end, the first locking end positioned opposite from the second locking end, the first locking end hingedly connected to the second ledge end by a subpanel hinge, the second locking end defining the locking tab.

5. A method for assembly a folded easel comprising:

obtaining a foldable easel blank in an unfolded position, the foldable easel blank comprising:

a main panel defining a top and a bottom, the main panel defining a front main surface and a rear main surface, the front main surface positioned opposite from the rear main surface;

a first side panel hingedly connected to the main panel by a first side hinge;

a second side panel hingedly connected to the main panel by a second side hinge; and a base panel hingedly connected to the main panel by a base hinge, a first base panel cutout extending from the bottom to the base hinge, a second base panel cutout extending from the bottom to the base hinge, the base panel positioned between the first side hinge and the second side hinge, a first leg defined between the first base panel cutout and the first side hinge, a second leg defined between the second base panel cutout and the second side hinge, the base panel positioned between the first leg and the second leg, the first leg and the second leg defining a bottom main surface at the bottom, the base panel defining a bottom base surface at the bottom, the bottom main surface being substantially coplanar with the bottom base surface in the unfolded position; and folding the first side panel about the first side hinge towards the rear main surface;

folding the second side panel about the second side hinge towards the rear main surface;

folding the base panel about the base hinge towards the rear main surface; and forming a base stand, forming the base stand comprising: securing the base panel to the first side panel and the second side panel.

6. The method of claim 5, further comprising folding a support panel about a support hinge towards the front main surface to form a ledge of the folded easel, the support panel being hingedly connected to the main panel by the support hinge.

7. The method of claim 5, wherein:

folding the base panel about the base hinge towards the rear main surface comprises folding the bottom base surface of the base panel away from the bottom main surface of the main panel;

the base panel defines a first base end and a second base end;

the first base end is disposed opposite from the second base end;

the first base end hingedly is connected to the main panel; and the second base end defines the bottom base surface.

8. The method of claim 5, wherein securing the base panel to the first side panel and the second side panel comprises engaging a corner of the base panel with a side aperture defined by the first side panel.

9. The method of claim 8, wherein securing the base panel to the first side panel comprises engaging a locking key with an enclosed locking slot, the locking key defined by the first side panel within the side aperture, the enclosed locking slot defined by the base panel.

* * * * *